United States Patent
Jansen et al.

(10) Patent No.: US 6,846,763 B2
(45) Date of Patent: Jan. 25, 2005

(54) REFRACTORY REPAIR MATERIAL BATCH

(75) Inventors: Helge Jansen, Friedland (DE); Heinrich Grosse Daldrup, Meerbusch (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 10/716,119

(22) Filed: Nov. 18, 2003

(65) Prior Publication Data

US 2004/0102306 A1 May 27, 2004

(30) Foreign Application Priority Data

Nov. 18, 2002 (DE) .......................................... 102 53 712

(51) Int. Cl.⁷ ....................... C04B 35/01; C04B 35/035; C04B 35/103; C04B 35/12; C04B 35/14; C04B 35/482

(52) U.S. Cl. .................... 501/94; 106/280; 106/284.02; 106/284.05; 106/284.01; 501/100; 501/101; 501/103; 501/109; 501/127; 501/132; 501/133; 501/99

(58) Field of Search ............................ 501/94, 99, 100, 501/101, 102, 109, 127, 132, 133; 106/280, 284.01, 284.02, 284.05

(56) References Cited

U.S. PATENT DOCUMENTS

| | | | | |
|---|---|---|---|---|
| 3,236,664 A | * | 2/1966 | Wilson .......................... | 501/99 |
| 4,102,694 A | * | 7/1978 | Sasaki et al. .................. | 501/99 |
| 4,436,678 A | * | 3/1984 | Nishikawa et al. ........... | 264/30 |

* cited by examiner

Primary Examiner—David Brunsman
(74) Attorney, Agent, or Firm—Goodman & Teitelbaum, Esqs.

(57) ABSTRACT

A refractory repair batch material includes a refractory, in particular a basic resistor component in granule form and a binder system. The binder system contains at least one hard bitumen component in granule form, at least one ignitable metal powder and at least one combustible mineral oil.

19 Claims, No Drawings

REFRACTORY REPAIR MATERIAL BATCH

BACKGROUND OF THE INVENTION

The invention relates to a refractory repair material batch for repairing worn areas in refractory linings, in particular in metallurgical furnaces or vessels, e.g. in converters.

Repair materials of this type are also known as hot-repair materials, since they are introduced into the hot furnace or into the hot vessel. They are used to repair what are known as pre-worn locations, i.e. locations in the refractory lining which are experiencing spalling or flaking which does not yet require complete removal and replacement of the refractory lining. In such applications, depending on the nature and structure of the batch, materials are, for example, pneumatically sprayed or cast or poured or introduced by centrifuging. Spraying allows accurate and controlled application to the locations which are to be repaired, and consequently this is the preferred method.

It is known to spray basic hot-repair materials, in particular including basic linings, which are made up with water and generally do not contain any carbon. Moreover, basic hot-repair materials which may contain carbon and are anhydrous are also known. However, these repair materials cannot be sprayed.

The water in the hot-repair materials leads to very substantial thermal shocks at the repair locations and therefore to the formation of cracks which adversely affect the success of the repair. Moreover, it is only possible to achieve relatively low bonding forces between repair material and repair location, and consequently the wear resistance at the repair location is reduced. Moreover, the water attacks the basic material of the refractory lining, which may be destroyed by hydration.

Although carbon-containing hot-repair materials do not have the abovementioned drawbacks of the water-containing hot-repair materials, they cannot be sprayed.

BRIEF SUMMARY OF THE INVENTION

It is an object of the invention to provide an anhydrous hot-repair material which is non-toxic and is not a problem in terms of health and safety at work and which can be made in free-flowing or trickling form and can therefore be sprayed, cast, poured and centrifuged, ensures very good adhesion and wear resistance and does not cause any harmful thermal shocks.

This object is achieved by a hot-repair material having the features set forth below. Advantageous refinements of the invention are characterized below.

DETAILED DESCRIPTION OF THE INVENTION

According to the invention, the hot-repair material includes at least one resistor component, in the form of a refractory material which is known per se, such as MgO, dolomite, $Al_2O_3$, $MgAl_2O_4$, $SiO_2$, $ZrO_2$, chromium oxide. This refractory material is selected as a function of the lining material which is to be repaired and is preferably used in a grain size which is matched to the grain size of the lining material of the furnace or vessel.

The generally free-flowing resistor component in granule form is embedded in a multifunctional binder system comprising at least one hard bitumen component in granule form, at least one metal powder which is ignitable at the temperature of use and at least one mineral oil which is combustible at the temperature of use.

The binder system binds together the grains of the resistor component in the manner of a binder, so that it is possible to produce a processable hot-repair material of controllable consistency. The consistency can be set in such a manner that the material can either be sprayed or cast or poured or can flow freely or can be centrifuged; accordingly, to this extent the material is technologically universally applicable.

The binder system is self-igniting and ignites at the latest when it comes into contact with the hot repair location; moreover, the binder system reacts exothermically. During application, the binder system first of all becomes sticky and adheres or embeds itself very successfully at the repair location by penetrating into the pores or recesses, so that even steep to vertical or overhanging wall regions which have become worn can be repaired.

Moreover, as a result of coking of the bitumen, the binder system forms a carbon matrix which binds the resistor component by means of the carbon binding mechanism which is known per se, with the matrix carbon—as is likewise known per se—reducing the wetability of the repair material in situ with respect to the metallurgical material in the furnace or vessel after it has been applied in the desired way.

The metal powder of the binder system should ignite at approximately 500° C. and cause the mineral oil, which serves as an energy carrier and is in particular a heavy oil, for example flux oil or used oil, to burn, so that the hard bitumen melts, producing the required mobility of the repair material in the hot state, and cokes and thereby ensures the above-described properties which are desired in accordance with the invention.

The finely particulate metal powder, which is preferably used in a fineness of 90% by weight <45 $\mu$m, is oxidized and the metal oxides induce sintering reactions between the resistor grains of the repair material and also between the resistor grains of the repair material and the lining material, so that very good adhesion is produced by ceramic bonding too.

The mineral oil, which is preferably a flux oil, serves both as an energy carrier and to bind dust, so that the material does not form dust when it is being made up and can be handled very easily during repair work. It is also used to set the desired consistency of the material as a function of the particular application technique.

For example, slightly more flux oil is used for a material which is to be sprayed than for a free-flowing material.

To improve the carbon binding of the material, it is preferable to add at least one further carbon carrier, such as graphite, e.g. flake graphite, or carbon black.

The repair material according to the invention is therefore distinguished by carbon binding and ceramic binding and thereby ensures a particularly high wear resistance. It can easily be matched to the lining material by selecting the resistor component and can be used universally on account of the choice of consistency. Thermal shocks are not produced. The repair materials according to the invention can be sprayed using standard spraying machines.

It is preferable to use the following batches for the hot-repair material according to the invention:

45–90% by weight, in particular 67–80% by weight of resistor component, e.g. MgO sinter, 1.5–25% by weight, in particular 4–10% by weight of metal powder, e.g. Si powder, 3.5–20% by weight, in particular 10–15% by weight of hard bitumen granules, 5–10% by weight, in particular 6–8% by weight of mineral oil, e.g. flux oil.

According to the invention, first of all the dry components of the hot-repair material batch, such as resistor component, hard bitumen, metal powder and, if used, the further carbon carrier components, which may be added in an amount of up to 6% by weight, are mixed in a positive mixer and then the mineral oil is added. The material is then packaged in sacks and can then be delivered ready for processing.

By way of example, a material comprising the following constituents was mixed in a positive mixer using the process according to the invention:

70% by weight of MgO sinter,

4% by weight of flake graphite,

6% by weight of Si powder,

13% by weight of hard bitumen granules,

7% by weight of flux oil.

This repair material was sprayed on site in a steelworks onto a pre-worn location which was to be repaired in the converter mouth of a converter using an existing rotor-spraying machine. The repair location was still intact even after 30 batch changes. By contrast, the known repair materials previously used in this steelworks were only able to withstand up to a maximum of 15 batches.

What is claimed is:

1. A refractory repair batch material, comprising:

a refractory including a basic resistor component in granule form and a binder system, the binder system containing at least one hard bitumen component in granule form, at least one ignitable metal powder, and at least one combustible mineral oil.

2. The repair batch material as claimed in claim 1, wherein the resistor component is MgO and/or dolomite and/or $Al_2O_3$ and/or $MgAl_2O_4$ and/or $SiO_2$ and/or $ZrO_2$ and/or chromium oxide.

3. The repair batch material as claimed in claim 1, wherein the resistor component is present in a grain size which corresponds to a grain size of a lining material which is being repaired.

4. The repair batch material as claimed in claim 1, wherein the repair batch material has a consistency which can be sprayed or cast or poured, or is free-flowing, or can be centrifuged.

5. The repair batch material as claimed in claim 1, wherein the repair batch material provides a self-igniting reaction at temperatures of use.

6. The repair batch material as claimed in claim 1, wherein the repair batch material provides an exothermical reaction at temperatures of use.

7. The repair batch material as claimed in claim 1, wherein the refractory includes binding means to provide a carbon binding condition at temperatures of use.

8. The repair batch material as claimed in claim 1, wherein the refractory includes binding means to provide a ceramic binding condition at temperatures of use.

9. The repair batch material as claimed in claim 1, wherein the metal powder is selected to ignite at approximate 500° C.

10. The repair batch material as claimed in claim 1, wherein the mineral oil is selected to burn at temperatures of use, and the mineral oil is a heavy oil, a flux oil or a used oil.

11. The repair batch material as claimed in claim 1, wherein the hard bitumen component is selected to melt and coke to provide a carbon binding condition at temperatures of use.

12. The repair batch material as claimed in claim 1, wherein the metal powder is selected to oxidize and bring about a sintering reaction between the resister grains, and also between the resistor grains and a lining material which is being repaired.

13. The repair batch material as claimed in claim 1, wherein the metal powder has a fineness of 90% by weight <45 $\mu$m.

14. The repair batch material as claimed in claim 1, wherein the refractory contains at least one carbon carrier including a graphite, a flake graphite, or a carbon black in amounts of up to 6% by weight.

15. The repair batch material as claimed in claim 1, wherein the refractory has the following compositions:

(1) 45–90% by weight of the resistor component;

(2) 1.5–25% by weight of the metal powder;

(3) 3.5–20% by weight of the hard bitumen component; and (4) 5–10% by weight of the mineral oil.

16. The repair batch material as claimed in claim 1, wherein the refractory has the following compositions:

(1) 67–80% by weight of the resistor component consisting of a MgO sinter;

(2) 4–10% by weight of the metal powder consisting of a Si powder;

(3) 10–15% by weight of the hard bitumen component in granule form; and (4) 6–8% by weight of the mineral oil consisting of a flux oil.

17. A process for producing a refractory repair batch material comprising:

mixing dry components including a resistor component, a hard bitumen component, and a metal powder in a positive mixer; and then adding a mineral oil to form a refractory.

18. The process as claimed in claim 17, wherein the refractory is packaged in sacks.

19. The process as claimed in claim 17, wherein a carbon carrier is also mixed in a positive mixer before the mineral oil is added.

* * * * *